*United States Patent* [19]

Laul

[11] Patent Number: 5,309,218

[45] Date of Patent: May 3, 1994

[54] GAS RING LASER GYRCSCOPES

[75] Inventor: Virgil R. Laul, Dana Point, Calif.

[73] Assignee: Northrop Corporation, Los Angeles

[21] Appl. No.: 682,402

[22] Filed: Dec. 17, 1984

[51] Int. Cl.[5] .......................... G01B 9/02; H01S 3/083
[52] U.S. Cl. ...................................: 356/350; 372/94
[58] Field of Search ........................... 356/350; 372/94

[56] References Cited

U.S. PATENT DOCUMENTS 3,503,005 3/1970 Mocker .......................... 356/350 X
4,325,033 4/1982 Shutt ............................... 356/350 X

*Primary Examiner*—Stephen C. Buczinski

*Attorney, Agent, or Firm*—Terry J. Anderson; Robert B. Block; Karl J. Hoch, Jr.

[57] ABSTRACT

In a gas ring laser gyroscope characterized by a gain medium for producing at least one monochromatic narrow electromagnetic beam reflected to form a loop about the gain medium, the improvement wherein bypass channels are provided, displaced from the beam path, for reducing gas flow in the beam path. The bypass channels may extend about the gain medium and across the beam loop and may include controllable restrictions therein for selecting the flow rates therethrough.

8 Claims, 2 Drawing Sheets

GAS RING LASER GYRCSCOPES

BACKGROUND OF THE INVENTION

1. Field of the Invention

The present invention relates to ring laser gyroscopes, and more particularly, to improvements in the structure of gas laser gyroscopes reducing gas flows therein.

2. Description of the Prior Art

The use of ring laser gyroscopes as guidance instruments has been known in the past. Typically, such lasers take the form of a closed resonator loop in which oppositely injected laser beams are bent into closed paths by various turning mirrors. Any rotation about an axis orthogonal to the plane of the loop then results in opposite frequency shifts of the two beams and the resulting beat frequency then provides a quantitative measure of the turning rate.

In this general arrangement the laser beams are typically turned by mirrors at the end of straight segments, one or more of which providing the location for the laser gain tube or the gain medium. Thus, the geometry of the ring laser gyroscope typically includes straight line segments of a resonator tube through which the beams are passed.

While the recent past has seen suggestions of solid state lasers for ring gyroscope use, the practicalities still dictate the use of gas lasers with substantial preference still remaining for the He-Ne (helium/neon) laser. Gas lasers, however, exhibit induced flows generally described by the work of I. Langmuir (1923) J. Franklin Institute 196,751 which are partly explained in terms of light velocity changes in a moving refractive medium, i.e., the Fresnel-Fizeau drag effect. Additionally, Doppler shifts are associated with the flow which, again, affect the frequency of the laser. This induced velocity change, therefore, inserts substantial null errors into the ring laser which, heretofore, has been carried as a readout bias. Any drifts, however, in this Langmuir flow present large potential for gyroscope errors and substantial research has been expended at reducing this induced flow.

Typical of these efforts are the teachings of U.S. Pat. No. 4,284,329 to Smith et al in which a partial restriction is inserted into the flow path. Alternatively, an opposite, compensating discharge path is provided, as in U.S. Pat. No. 4,397,027 to Zampiello et al. Each of these solutions, while suitable for their purposes, depend on cancellation or restriction of substantial gas flows and thus entail manipulations of large volumes which, in themselves, are prone to generate large errors. Thus, the prevailing practices in the past require close control at restricting or compensating large effects and consequently demand extreme accuracy in the implementation thereof.

Accordingly, techniques which directly address the phenomenon of gas flow are desired and it is one such technique that is disclosed herein.

SUMMARY OF THE INVENTION

Accordingly, it is the general purpose and object of the present invention to provide equalization paths in gas ring laser gyroscopes for reducing the gas flows therein.

Other objects of the invention are to provide passive equalization paths for reducing the Langmuir flows associated with gas lasers.

Yet further objects of the invention are to provide means for reducing pressure differentials between the cathode and anode of a gas laser.

Briefly, these and other objects are accomplished within the present invention by providing a passive gas bypass for equalizing the pressures across the discharge path of a gas laser gyro which may be conformed as a split discharge configuration gain medium confined to one leg of the resonator. In each of the foregoing embodiments the gas bypass channel is geometrically arranged to establish only one breakdown path at initiation, i.e., the gain path of the gyro.

Subject to the foregoing discharge requirements a further embodiment is disclosed herein essentially in the form of an open resonator which, nevertheless, provides only one path across which discharge occurs. This last embodiment offers the further advantages of a substantial cavity in which nonstationary thermal inequalities are dispersed thus reducing a major source of error.

DESCRIPTION OF THE PREFERRED EMBODIMENTS

The implementations offered herein provide solutions to phenomena understood with some imprecision and for that reason the explanatory discourse that follows is general only. Moreover, the implementations are intended to be exemplary only and no intent to limit the scope of the invention is expressed by the selection thereof.

Figure 1:
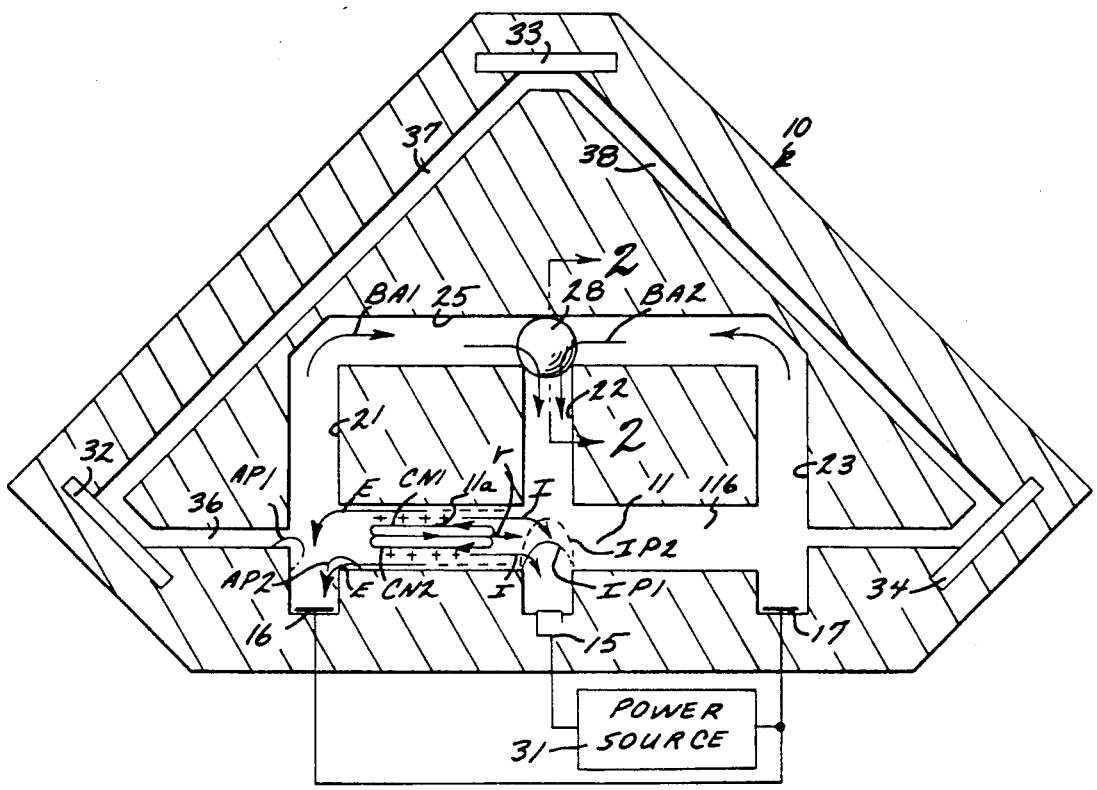
FIG. 1 is a diagrammatic illustration of a gas ring laser gyroscope, constructed in accordance with one embodiment of the present invention.

As shown in FIG. 1 a ring laser gyro generally illustrated as a triangular resonator cavity structure 10, includes in one leg thereof a gain medium 11, illustrated as a split discharge medium comprising a common cathode 15 deployed centrally between two adjacent anodes 16 and 17. Typical of such split discharge configurations each segment thereof, i.e., segments 11a and 11b, once the discharge is set off, will include flow patterns generally referred as the Langmuir flow. In accordance with the accepted models this flow occurs as result of the electron flow E, positive ion flow I and a resulting neutral atom flow V. Thus the neutral neon atoms in a He-Ne laser, which are the same atoms excited to produce the stimulated emission, are set in motion along the center of the gain medium tube and it is at this same center that laser radiation exists.

In the foregoing model the electron flow E is along the walls of the tube to the anodes 16 and 17. The positive ion flow I, once again, proximate the walls, is then towards the cathode 15 where it is neutralized and builds up a pressure shown by gradient lines IP1 and IP2. To compensate this imbalance in momentum exchange currents of neutral gas CN1 and CN2 are formed which have a net velocity component V towards the cathode along the tube center. According to the well-known Fresnel-Fizeau effect the velocity of light V in this central moving medium is expressed as:

$$V = C/n \pm \left(1 - \frac{1}{n^2}\right)$$

where C is the speed of light in a vacuum, and n is the index of refraction. Thus, substantial null shifts are imposed on the laser depending on the beam direction relative this flow.

In the past this null shift was simply treated as a net effect or zero offset and the measurement was directly superposed thereover. Since this zero offset, however, often reaches levels of 5 to 10 deg/hr. any uncompensated errors then result in errors unacceptable for navigation or guidance. Accordingly, any reduction in the flow down the tube center directly reduces the magnitude of any uncompensated errors.

In accordance with the invention herein substantial flow reductions can be achieved by way of a set of bypasses shown as bypass channels 21, 22 and 23 respectively tied between the anode 16, the cathode 15, the anode 17 and a plenum chamber 25. The alignment of channels 21, 22 and 23 is substantially orthogonal to the beam path in vertical deployment over the anodes and the common cathode. Thus, the pressure gradients at the anodes AP1 and AP2 will set up flows in the bypass channels 21 and 23 which has been found to approximate the following relationship:

$$(F - 1) = \left(\frac{DB}{DG}\right)^4 \left(\frac{1}{\left[1.5 + \frac{1}{K^4}\right]}\right)$$

where F is the flow reduction factor through the gain medium, DB is the diameter of the bypass, DG is the diameter of the gain tube, K is the ratio of the plenum diameter to the bypass tube diameter and the factor 1.5 reflects an approximation of the gain tube length.

Accordingly, a flow reduction through the gain medium is achieved which is only weakly dependent of the bypass length. It is therefore convenient to select bypass lengths through which discharge can not occur.

Figure 2:
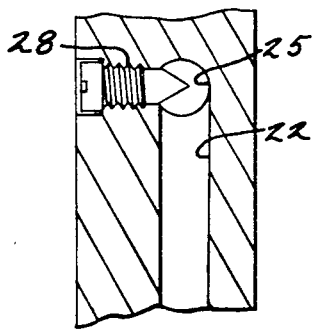
FIG. 2 is a side view detail taken in section along line 2—2 of FIG. 1.

As shown further in FIGS. 1 and 2, the foregoing bypass arrangement may include an adjustable restriction in the form of a plunger valve 28 at the juncture of bypass channel 22 and the plenum chamber 25. This central restriction arrangement is thus available to provide damping for any unwanted flow resonances and to adjust the bypass flow.

As is conventionally required, a power source 31 is connected between the anodes 16 and 17 and the common cathode 15 and the triangular beam pattern established by way of mirrors 32, 33 and 34 at the ends of resonator tubes 36, 37 and 38 where tube 36 aligns to receive the gain medium 11. The bypass manifolding comprising bypass channels 21, 22 and 23 and the plenum chamber 25 then straddles the gain medium 11 forming a path offset from the axis of tube 36. Within this bypass manifold flows then occur along the arrows BA1 and BA2, once again, from anodes 16 and 17 to the cathode 15.

Figure 3:
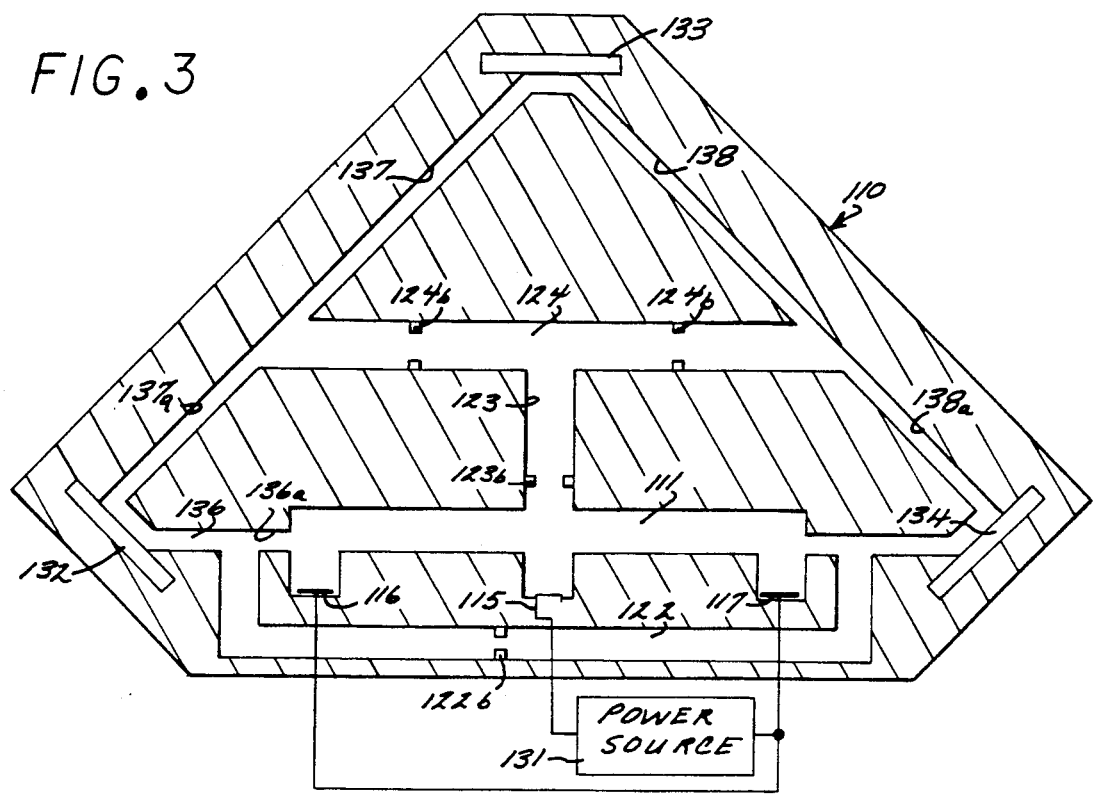
FIG. 3 is yet another diagrammatic illustration of a ring laser gyro constructed in accordance with a further embodiment of the present invention.

In a further implementation illustrated in FIG. 3 the plurality of bypasses is set out comprising an equalizing bypass channel 122 extending across the gain medium 111 which equalizes the end pressure thereof. As result of this bypass equal pressures are developed at the ends of the gain medium thus reducing any flow inequalities therethrough. The gain medium, once more, may take the form of a split discharge tube on either side of a common cathode 115 aligned below a center compensating bypass channel 123 communicating with a transfer channel 124 extending across the other resonator tube segments 137 and 138 which, together with the resonator tube 136 on which the gain medium 111 is inserted, form the resonator loop of the ring laser gyro 110. In the foregoing arrangement resonator segments 136, 137 and 138, once again, span the distances between turning mirrors 132, 133 and 134, the resonating tube portions between the gain medium 111 and the transfer channel 124 forming enlarged sections 137a, 138a and 136a to accommodate the compensating flows.

Thus, the bypass channel 122 equalizes the pressures at the ends of gain medium 111 while the combination of the channels 123 and 124 reduce the absolute flow levels within the discharge tubes. In this manner the errors as result of directional inequalities are equalized to a large extent by the bypass channel 122. Errors which depend on the absolute flow levels which, in turn, are reduced by the circulation through channels 123 and 124. Of course, all the bypass channels, once again, may be provided with the requisite restrictions 122b, 123b and 124b both to damp any circulation resonances and to control the level of flow.

Figure 4:
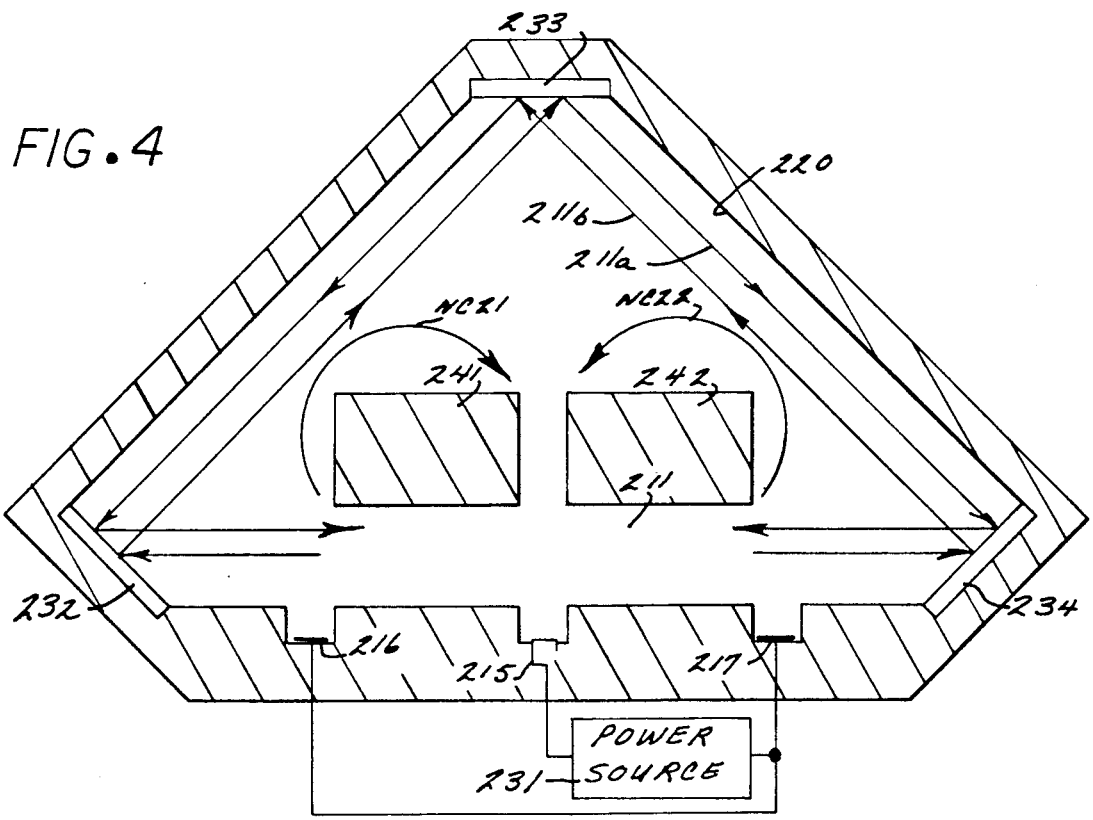
FIG. 4 is a further diagrammatic illustration of a ring laser gyro in accordance with yet another embodiment of the invention herein.

In yet a further embodiment, illustrated in FIG. 4, a ring gyro configuration essentially of an open resonator form is disclosed. As shown in this figure a gain medium 211, again of the split discharge form, is inserted into a cavity 220 in which mirrors 231, 232 and 233 set up the beam path of the gyro. As is typical of all ring laser gyros the gain medium 211 provides the two oppositely directed traveling waves, shown as beam loops 211a and 211b which, however, are unconstrained over most of their path by the section of a resonator tube. The beam constraint, therefore, occurs at the mirrors with the open resonator cavity 220 then forming an enlarged section for reducing the Langmuir flows. These flows are illustrated as the dispersed momentum exchange currents NC21 and NC22 around structural blocks 241 and 242 which set the discharge paths.

In this last embodiment the volumetric aspects of the open resonator cavity disperse the effect of any non-stationary thermal effects, thus improving accuracy while at the same time dispersing the Langmuir flows.

Obviously, many modifications and changes may be made to the foregoing description without departing from the spirit of the invention. It is therefore intended that the scope of the invention be determined solely on the claims appended hereto.

What is claimed is:

1. In a gas laser assembly characterized by a resonator cavity opening into a gain medium which is conformed to inject a laser beam into said resonator cavity and turning means disposed in said resonator cavity for returning said beam to said gain medium, the improvement comprising:

a bypass tube connected across said gain medium for equalizing pressure differences at the ends thereof.

2. Apparatus according to claim 1 wherein:

said gain medium comprises an electrical discharge tube, having a cathode and and an anode connected across a source of electrical excitation, said discharge tube opening into said resonator cavity, and a gas contained within said discharge tube and said resonator cavity.

3. Apparatus according to claim 2 wherein: said bypass tube is conformed to open into said discharge tube adjacent said anode and said cathods.

4. Apparatus according to claim 3 wherein: said bypass tube includes restrictions on the interior thereof for limiting the gas flow therethrough.

5. In a gas ring laser gyroscope characterized by a resonator cavity extending across a laser gain medium, said laser gain medium including at least two discharge paths formed across an anode and a cathode for injecting a first and a second oppositely directed beam into said resonator cavity, the improvement comprising: bypass means formed across said resonator cavity and across said gain medium for equalizing the pressures at the junctures thereof.

6. Apparatus according to claim 5 wherein: said gain medium is conformed as a split discharge tube including said cathode centrally located therein and said anodes proximate the ends thereof.

7. Apparatus according to claim 6 wherein: said bypass means comprises an enlargement of said resonator cavity offset from the path of said first and second beam.

8. Apparatus according to claim 6 wherein: said bypass means comprises a manifolded cavity opening into said split discharge tube adjacent to said cathode and said anodes.

* * * * *

UNITED STATES PATENT AND TRADEMARK OFFICE
CERTIFICATE OF CORRECTION

PATENT NO. : 5,309,218
DATED      : May 3, 1994
INVENTOR(S) : Virgil R. Laul

It is certified that error appears in the above-identified patent and that said Letters Patent is hereby corrected as shown below:

On the Title Page, item [54] and Column 1, line 3,

Title, change "GYRCSCOPES" to -- GYROSCOPES --

Signed and Sealed this

Second Day of August, 1994

*Attest:*

BRUCE LEHMAN

*Attesting Officer*    Commissioner of Patents and Trademarks